United States Patent
Mukouyama et al.

(10) Patent No.: US 6,987,733 B2
(45) Date of Patent: Jan. 17, 2006

(54) ATM COMMUNICATION APPARATUS AND ATM CELL FORWARDING CONTROL METHOD

(75) Inventors: Hiroyuki Mukouyama, Yokohama (JP); Yoshihiro Ashi, Yokohama (JP); Atsushi Iwamura, Yokohama (JP); Masanobu Kobayashi, Yokohama (JP); Yasuhiko Numagami, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 890 days.

(21) Appl. No.: 09/733,095

(22) Filed: Dec. 11, 2000

(65) Prior Publication Data

US 2004/0202169 A1 Oct. 14, 2004

(30) Foreign Application Priority Data

Aug. 10, 2000 (JP) ........................ 2000-247940

(51) Int. Cl.
  *H04J 1/16* (2006.01)
  *H04L 12/56* (2006.01)

(52) U.S. Cl. .............. 370/236; 370/395.21; 370/395.71
(58) Field of Classification Search ................ 370/230, 370/232, 233, 234, 236, 395.2, 395.21, 395.7, 370/395.71, 413
See application file for complete search history.

(56) References Cited

U.S. PATENT DOCUMENTS

| | | | | |
|---|---|---|---|---|
| 5,396,460 A | * | 3/1995 | Harada et al. | 365/220 |
| 5,710,770 A | * | 1/1998 | Kozaki et al. | 370/368 |
| 5,838,677 A | * | 11/1998 | Kozaki et al. | 370/389 |
| 5,987,008 A | * | 11/1999 | Simpson et al. | 370/236 |
| 6,141,323 A | * | 10/2000 | Rusu et al. | 370/236 |
| 6,285,675 B1 | * | 9/2001 | Sakurai et al. | 370/391 |
| 6,301,253 B1 | * | 10/2001 | Ichikawa | 370/395.71 |
| 6,532,234 B1 | * | 3/2003 | Yoshikawa et al. | 370/395.4 |
| 6,711,133 B1 | * | 3/2004 | Suetsugu | 370/236.1 |
| 2001/0043597 A1 | * | 11/2001 | Kozaki et al. | 370/368 |

* cited by examiner

*Primary Examiner*—Chau Nguyen
*Assistant Examiner*—Blanche Wong
(74) *Attorney, Agent, or Firm*—Mattingly, Stanger, Malur & Brundidge, P.C.

(57) ABSTRACT

An ATM communication apparatus having a buffer memory for storing cells received from each of input lines, a write control unit for writing each of the received cells into the buffer memory so that the cells stored in the buffer memory form cell queues corresponding to connections for each output line, a read control unit for reading out cells from each of the cell queues while guaranteeing a minimum cell rate predetermined for each connection within a range not exceeding a predetermined peak cell rate, and a unit for adding congestion indication to a cell read out from a cell queue of which stored cell amount exceeds a preset threshold.

7 Claims, 11 Drawing Sheets

OUTPUT LINE NUMBER : p          15-P

| VPI/VCI | NUMBER OF STORED CELLS (CELL QUEUE LENGTH) | THRESHOLD : TH | DISCARD INDICATION FLAG |
|---|---|---|---|
| | | | |
| | | | |
| | | | |

| CONNECTION IDENTIFIER | PEAK CELL RATE (PCR) | MINIMUM OR GUARANTEED CELL RATE (mCR) | SHARED BANDWIDTH (PCR - mCR) |
|---|---|---|---|
| A | 0.8 | 0.4 | 0.4 |
| B | 0.8 | 0.3 | 0.5 |
| C | 0.6 | 0.2 | 0.3 |
| D | 0.4 | 0.2 | 0.2 |
| E | 0.4 | 0.1 | 0.3 |

(Mbit /s)

| CONNECTION IDENTIFIER | FLAG BITS | | | | |
|---|---|---|---|---|---|
| A | 1 | 1 | 1 | 1 | 0 | ~19A
| B | 1 | 1 | 1 | 1 | 1 | ~19B
| C | 1 | 1 | 1 | 0 | 0 | ~19C
| D | 1 | 1 | 0 | 0 | 0 | ~19D
| E | 1 | 1 | 1 | 0 | 0 | ~19E

| FLAG BITS | | | | |
|---|---|---|---|---|
| 1 | 1 | 1 | 1 | 0 | ~19A
| 1 | 1 | 1 | 1 | 0 | ~19B
| 1 | 1 | 1 | 0 | 0 | ~19C
| 1 | 1 | 0 | 0 | 0 | ~19D
| 1 | 1 | 1 | 0 | 0 | ~19E

ATM COMMUNICATION APPARATUS AND ATM CELL FORWARDING CONTROL METHOD

BACKGROUND OF THE INVENTION (1) Field of the Invention

The present invention relates to an ATM (Asynchronous Transfer Mode) communication apparatus and an ATM cell forwarding control method and, more particularly, to an ATM communication apparatus having the function of avoiding occurrence of congestion in an ATM network and an ATM cell forwarding control method for avoiding occurrence of congestion.

(2) Description of the Related Art

As a personal computer is widely spreading and the use of the Internet is increasing in recent years, in an access network, bursty data traffic is increasing other than voice and image traffics. In consideration of future trends in access networks, as service classes aiming at avoiding a congestion state which can occur in an access network where traffic is heavy and at efficiently accommodating traffic, the ATM forum and ITU (International Telecommunication Union) propose ABR (Available Bit Rate) and GFR (Guaranteed Frame Rate).

In the ABR service, each of user terminals determines an ACR (Allowed Cell Rate) which can be used each time in accordance with the state of a network by setting a PCR (Peak Cell Rate) as the upper limit of a cell transmission rate and an MCR (Minimum Cell Rate) as the lower limit. A data source end system searches for an ACR of itself from RM cells inserted to a data cell train at predetermined intervals (or predetermined frequency according to a bandwidth used). In each of the RM cells, the value of the PCR of the source end system is set as an explicit cell rate (ER). Each of nodes on an ABR connection can revise the value in the ER field in a received RM cell downward to a cell rate which can be supported by the node. At a node where congestion occurs, by setting an explicit forward congestion indication (EFCI) bit of a passing data cell to "1", the occurrence of the congestion can be notified to a destination end system.

The destination end system receives an RM cell and returns it to the source end system. In the case where the occurrence of the congestion in the network was notified by the explicit forward congestion indication (EFCI) bit in the data cell, the destination end system rewrites the congestion indication (CI) bit in the RM cell to be returned to the source end system to "1". When there is no special change in the contents of the returned RM cell, the source end system increases the value of the ACR at a predetermined rate, thereby gradually bringing the transmission cell rate to the PCR. On the contrary, when the congestion indication (CI) bit in the received RM cell is "1", the ACR is decreased at a predetermined rate (1/RDF: Rate Decrease Factor). If the value of the ER set by the source end system has been rewritten to a lower value, by decreasing the allowed cell rate (ACR) to the value designated by the ER, a break from the congestion state is attempted.

On the other hand, in order to efficiently accommodate the traffic, GFR guarantees the minimum cell rate for each of connections. When an unused bandwidth exists in a transmission line, GFR allows the unused bandwidth to be equally shared by a plurality of connections multiplexed on the transmission line. In the case where an ATM cell is discarded at the time of congestion, in the GFR service, it is proposed to discard the cells on a packet unit basis by expecting a data retransmitting function of an upper layer in communication between terminals, such as the TCP/IP (Transmission Control Protocol/Internet Protocol).

SUMMARY OF THE INVENTION

The GFR service realizes communications effectively using an unused bandwidth in a transmission line within the range of the peak cell rate of each of connections. In the GFR service, however, the transmission rate of each of the connections depends on the traffic volume on the transmission line. When the traffic increases and the unused bandwidth decreases, a problem such that the transfer rate of each connection decreases close to the minimum cell rate arises. Consequently, for example, when a source end terminal transmits ATM cells at a rate close to the peak cell rate, if the transmission line is unoccupied, high-speed data transfer effectively utilizing the unused bandwidth can be performed. When the traffic volume increases and the transfer rate which can be allocated to each of the connections decreases, however, the amount of cells stored in the ATM node increases and a connection which enters a congested state occurs.

The conventional GFR service takes a negative measure such that when congestion occurs, a packet which becomes invalid due to discarding a cell thereof is recovered by retransmission from the source end terminal. A control of a cell amount transmitted from a terminal in accordance with the traffic volume to prevent occurrence of congestion is not performed. In the ABR service, the allowed cell rate (transmission cell amount) of the source end terminal is controlled at a time point when an RM cell transmitted from the source end terminal is returned by the destination end terminal and received by the source end. Consequently, a prompt bandwidth control according to a change in the state of the traffic cannot be performed, so that the unused bandwidth of the transmission line cannot be always effectively used.

An object of the invention is to provide an ATM communication apparatus capable of preventing occurrence of congestion by guaranteeing a minimum cell rate to each of connections and allocating an unused bandwidth to each of the connections in accordance with fluctuations in traffic.

Another object of the invention is to provide an ATM cell forwarding control method capable of effectively utilizing a bandwidth of each transmission line in an ATM network by dynamically controlling a transfer bandwidth of each connection within a predetermined bandwidth range.

In order to achieve the objects, according to the invention, an ATM communication apparatus which is connected to a plurality of input lines and a plurality of output lines and transmits a cell received from each of the input lines to one of the plurality of output lines, which is specified by connection identification information included in a header of each of the received cells, has (a) a buffer memory for temporarily storing cells received from each of the input lines, (b) a write control unit for writing the cells received from each of the input lines into the buffer memory so that cells stored in the buffer memory form cell queues corresponding to connections for each output line, (c) a read control unit for reading out cells from each of cell queues formed in the buffer memory while guaranteeing a minimum cell rate predetermined for each connection within a range not exceeding a predetermined peak cell rate, and (d) means for adding congestion indication to a cell read out from a cell queue of which stored cell amount exceeds a preset threshold.

The read control unit is characterized by having, for example, (c1) a guaranteed bandwidth table in which information for allocating time slots to each of a plurality of connections multiplexed on the output line while guaranteeing a minimum cell rate is stored for each of the output lines, (c2) a shared bandwidth table in which information indicative of an allocation range of idle time slots allowed to each of the connections multiplexed is stored for each of the output lines, and (c3) means for determining a connection for which a cell is to be read out by referring to the shared bandwidth table, in a time slot which enters an idle state since there is no cell to be transmitted in a cell queue in a connection designated by the guaranteed bandwidth table and an idle time slot to which a connection is not designated in the guaranteed bandwidth table.

According to the invention, an ATM cell forwarding control method in an ATM network including a plurality of nodes each connected to a plurality of input lines and a plurality of output lines, comprises: a step of writing ATM cells received from each of the input lines into a buffer memory so that stored cells form cell queues corresponding to connections for each output line at any of the nodes; and a step of, at the ATM node, reading out ATM cells from each of cell queues formed in the buffer memory while guaranteeing a minimum cell rate predetermined for each connection and controlling a rate so as not to exceed a predetermined peak cell rate, and transmitting each of the ATM cells to an output line corresponding to a connection after adding congestion indication to a cell which is read out from a cell queue of which stored cell amount exceeds a preset threshold.

According to the invention, before an ATM node actually enters a congestion state, congestion indication is added to a cell read out from a cell queue. A destination end system of the ATM cell added with the congestion indication transmits a control cell (RM cell) indicative of occurrence of congestion to a source end system of the received ATM cell. The ATM cell transmission amount is suppressed by the source end system which has received the control cell. In such a manner, the occurrence of congestion at the ATM node can be prevented.

The other objects and features of the invention will become apparent from the following description of the embodiments with reference to the accompanying drawings.

DESCRIPTION OF THE PREFERRED EMBODIMENTS

Embodiments of the invention will be described hereinafter with reference to the drawings.

Figure 1:
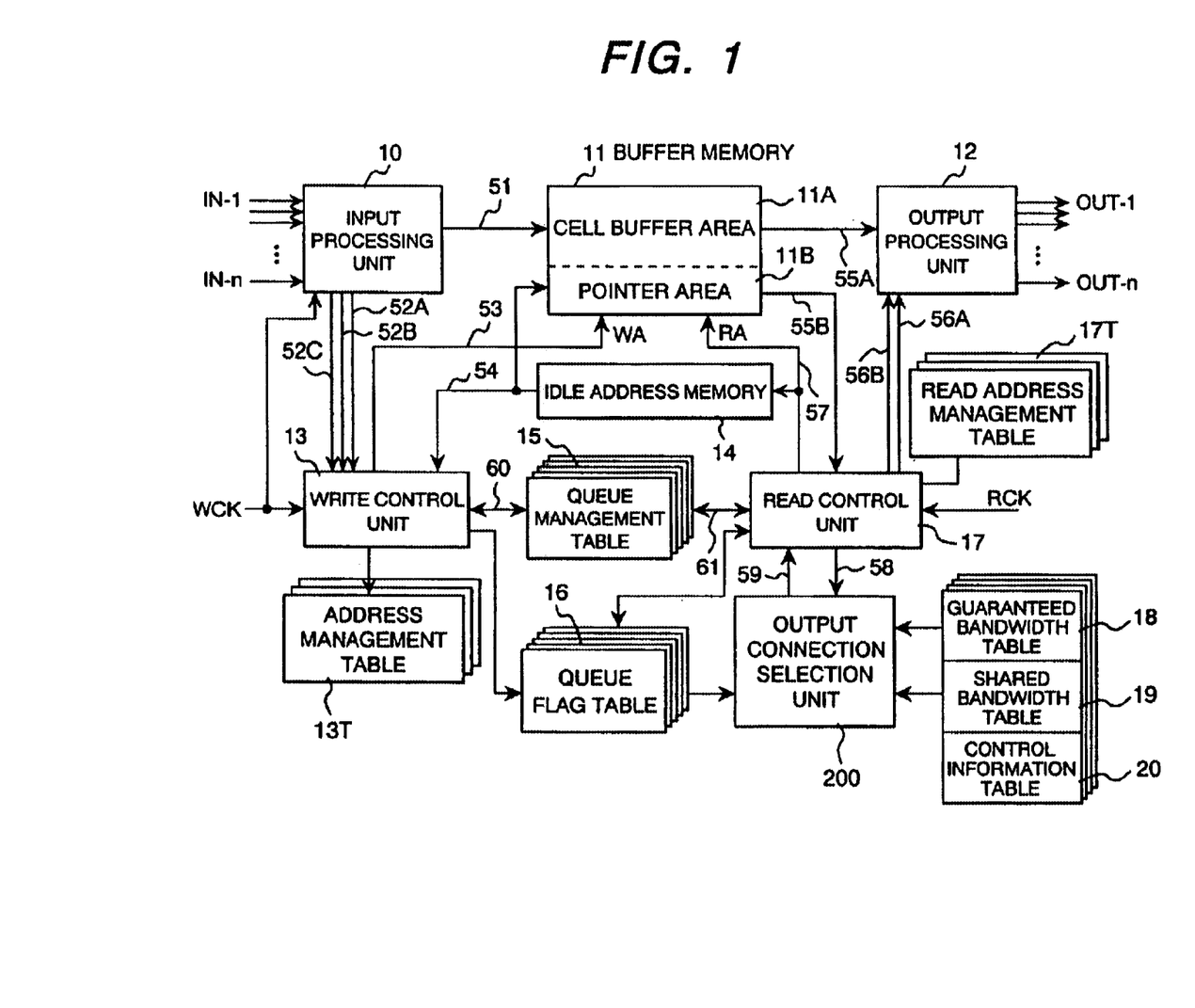
FIG. 1 is a block diagram showing an ATM communication apparatus according to an embodiment of the invention.

FIG. 1 shows an ATM switch connected to a plurality of input lines (input highways) IN-i (i=1 to n) and a plurality of output lines (output highways) OUT-i (i=1 to n) as an embodiment of an ATM communication system to which the invention is applied.

Figure 2:
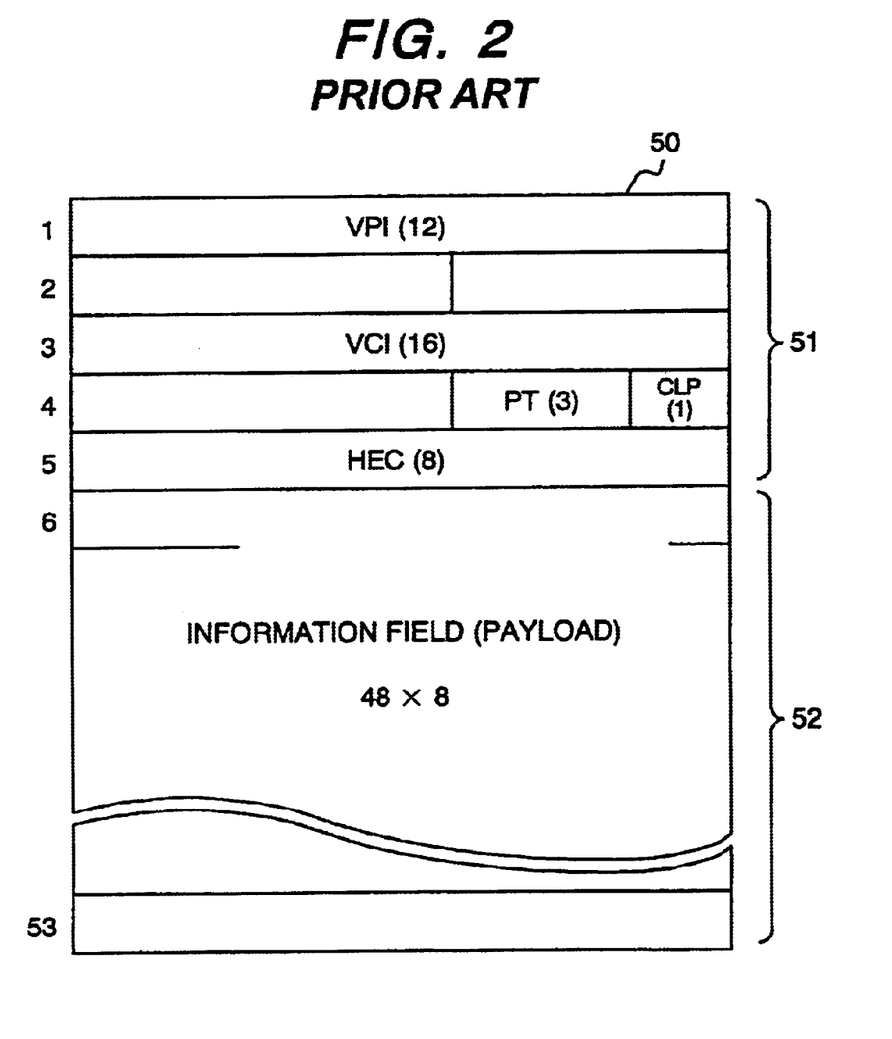
FIG. 2 is a diagram showing the format of an ATM cell.

As shown in FIG. 2, an ATM cell 50 to be supplied to each of the input lines IN-i is comprised of a cell header 51 of five bytes and a payload (information field) 52 of 48 bytes. The cell header 51 includes VPI/VCI as a connection identifier, a payload type PT of three bits, cell loss priority CLP of one bit, and header error control HEC. When the three bits of the payload type PT are designated by reference characters A, B, and C, a bit A indicates whether the cell is a user cell or a cell for management, a bit B indicates presence or absence of congestion, and a bit C indicates a segment type display bit for discriminating continuation or end of a frame (packet).

The header information of the ATM cell 50 supplied from each of the input line IN-i is rewritten by an input processing unit 10 including a plurality of input line interfaces corresponding to the input lines. After that, the resultant ATM cell is supplied to a cell buffer area 11A in a buffer memory 11 via a signal line 51. The rewriting of the header information includes rewriting of the connection identifier (VPI/VCI) and addition of an internal header including the number "p" of an output line (or output port) from which the input cell is to be transmitted.

Prior to the transmission of the input cell to the signal line 51, the input processing unit 10 notifies a write control unit 13 of the output line number "p" of the input cell, and the connection identifier and the segment type which are extracted from the cell header via signal lines 52A, 52B, and 52C, respectively. The write control unit 13 and the input processing unit 10 operate synchronously with a control clock WCK indicative of a write cycle.

The write control unit 13 has: an address management table 13T in which pointer addresses are stored in correspondence with identifiers of connections multiplexed on each of output lines for each output line number; and a queue management table 15 in which queue management information is stored in correspondence with the connection identifiers for each output line number. In each of the write cycles, the write control unit 13 executes a write control operation according to the flowchart shown in FIG. 3.

Figure 3:
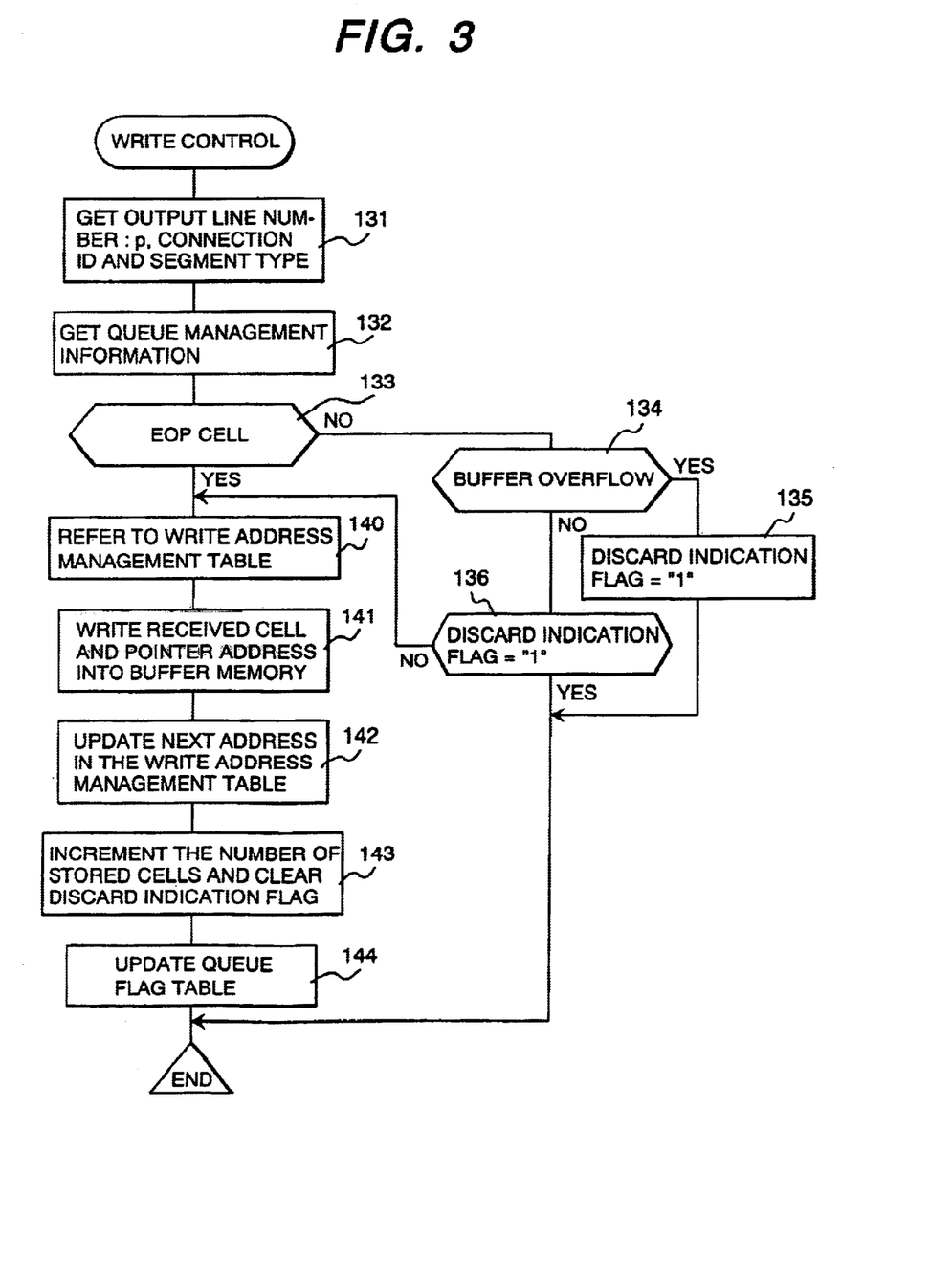
FIG. 3 is a flowchart showing operations of a write control unit 13 illustrated in FIG. 1.

Specifically, when the output line number "p", the connection identifier, and the segment type of the input cell are received from the signal lines 52A to 52C (step 131), the write control unit 13 reads out queue management information having the connection identifier from a queue connection table 15-p corresponding to the output line number "p" (step 132).

Figure 4:
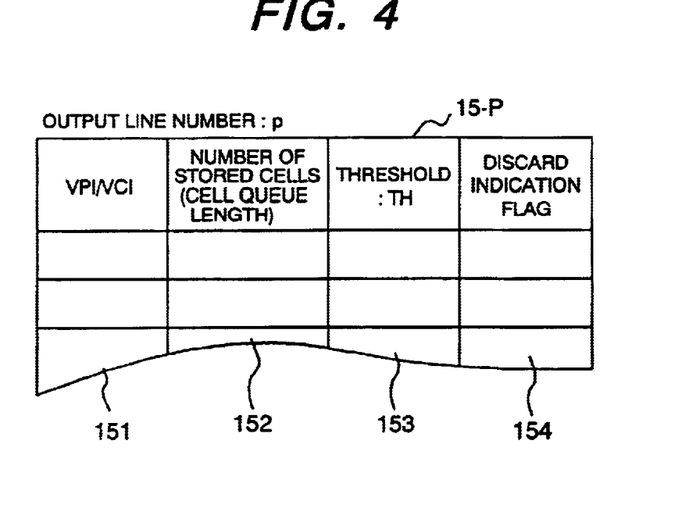
FIG. 4 is a diagram showing an example of a queue management table 15 illustrated in FIG. 1.

In the queue management table 15-p, as shown in FIG. 4, a plurality of queue management information entries are stored. Each of the entries indicates in correspondence with the identifiers (VPI/VCI) 151 of the connections multiplexed on the output line of the line number "p", length 152 of a cell queue (the number of stored cells) formed in the buffer memory 11, a threshold 153 for suppressing cell transmission, and a discard indication flag 154 which indicates whether a preceding cell belonging to the same packet as the received cell has been discarded or not. The threshold 153 is determined, for example, according to a value of the peak cell rate of each connection.

The write control unit 13 determines whether or not the received cell (hereinafter, called an EOP cell) is a cell including a final segment of one packet from the segment type received from the signal line 52C (step 133). When the received cell is a cell (first cell or intermediate cell) other than the EOP cell, the write control unit 13 determines whether the cell buffer area 11A in the buffer memory 11 is in an overflow state or not (step 134). When YES, the discard indication flag 154 of the corresponding entry in the queue management table 15-p is changed to the state "1" indicative of occurrence of the cell discarding (step 135) and the write cycle is finished without writing the received cell into the buffer memory 11.

Whether the cell buffer area 11A is in the overflow state or not can be determined by the number of idle addresses remaining in an idle address memory 14. If the cell buffer area 11A is not in an overflow state, the discard indication flag 154 of the corresponding entry in the queue management information is checked (step 136). When the discard flag is "1", that is, when at least one of preceding cells has been discarded, the write cycle is finished without writing the received cell into the buffer memory 11.

When the discard indication flag is "0" in step 136 or when it is determined in step 133 that the received cell is an EOP cell, the write control unit 13 reads out a pointer address corresponding to the connection identifier from a write address management table 13T-p corresponding to the output line number "p" (step 140) and outputs the pointer address to a signal line 53.

The pointer address is given as a write address WA to the buffer memory 11, thereby writing the received cell, which was outputted from the input processing unit 10 to the signal line 51, into a memory location of the address WA in the cell buffer area 11A. The memory address taken out from the idle address memory 14 to a signal line 54 is written into a memory location of the address WA in a pointer area 11B of the buffer memory 11 as a pointer address to be paired with the received cell (step 141).

The memory address taken out to the signal line 54 is stored into the write address management table 13T-p as a next pointer address with which the pointer address used as the write address WA by the write control unit 13 this time is replaced (step 142). When an ATM cell having the same connection identifier is supplied next time with the same output line number "p", by using the next pointer address as the write address WA, the received cell is written into the cell buffer area. By this operations, a series of ATM cells having the same connection identifiers are sequentially linked by the pointer addresses and a number of logical cell queues are formed for each output line in the buffer memory 11.

The write control unit 13 increments the number 152 of cells in the entry in the queue management table 15-p and sets the discard indication flag 155 to "0" (step 143), and updates a queue flag table 16 (step 144) in association with the writing of the ATM cell to the buffer memory 11.

The queue flag table 16 is, as will be described by referring to FIG. 9, to indicate the presence or absence of a stored cell by the flag bit "1" or "0" with respect to a plurality of connections multiplexed on the same output line. In a manner similar to the queue management table 15, the queue flag table 16 is comprised of a plurality of tables 16-p (p=1 to n) corresponding to the output line numbers. In the step 144, the bit corresponding to the connection identifier in the queue flag table 16-p corresponding to the output line number "p" of the received cell is set to "1".

Figure 5:
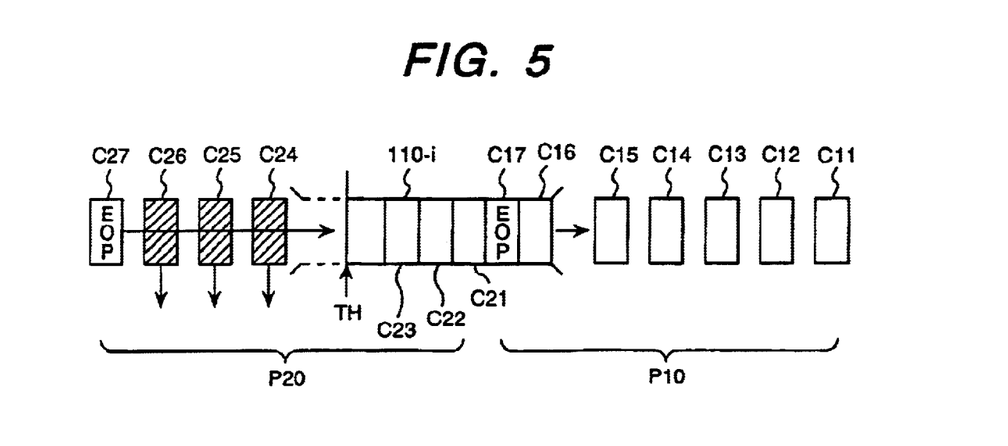
FIG. 5 is a diagram showing how a logical cell queue formed in a buffer memory 11 illustrated in FIG. 1.

By the write control, as shown in FIG. 5, a logical cell queue 110-i corresponding to the connection identifier is formed in the buffer memory 11. In the cell queue, for example, the remaining cells C16 and C17 in a packet P10 from which cells C11 to C15 as a part have been already outputted and cells C21 to C23 belonging to the next packet P20 are stored. If the buffer memory 11 enters the overflow state on receipt of a new cell C24 belonging to the packet P20, the cell C24 is discarded.

In the ATM communication apparatus of the invention, once discarding of a cell occurs, the subsequent cells C25 and C26 belonging to the same packet P20 as the discarded cell C24 are sequentially discarded irrespective of an unoccupied state of the buffer memory on receipt of the cells. An EOP cell C27 of the discarded packet P20 and received cells of the following new packet are added to the cell queue 110-i. In this case, in a destination end system of the packet P20, the EOP cell C27 is received after a while since the cell C23 which is stored in the cell queue before the discarding of cells occurs has been received. From the relation between the received cell C23 and the EOP cell C27, the destination end system can recognize that a part of the packet P20 (the cells C24 to C26) has dropped out. In this case, the destination end system requests the source end system to retransmit the packet.

The ATM cells and the pointer addresses stored in the buffer memory 11 are read out by a read control unit 17. The read control unit 17 has a read address management table 17T for storing a pointer address in correspondence with the connection identifier for each output line number, and is connected to an output connection selection unit 200 via signal lines 58 and 59.

The read control unit 17 counts control clocks RCK for indicating a read cycle which appears alternately with the write cycle, generates the output line number "p" from which a cell is to be transmitted and a time slot number "s" on each of the output lines, and supplies the numbers "p" and "s" to the output connection selection unit 200 via the signal line 58. As will be described hereinafter, the output connection selection unit 200 determines the identifier of a connection from which a cell is to be transmitted to the s-th time slot of the output line of the line number "p" by referring to a guaranteed bandwidth table 18, a shared bandwidth table 19, and a control information table 20, and outputs the connection identifier to the signal line 59.

When the connection identifier is received from the signal lint 59, the read control unit 17 refers to the queue management information entry corresponding to the connection identifier from the queue management table 15-p corresponding to the output line number "p", and determines whether the number 152 of stored cells (cell queue length) exceeds the threshold (TH) 153 or not.

If the queue length exceeds the threshold (TH) 153, insertion of an EFCI (Explicit Forward Congestion Indication) bit is instructed to an output processing unit 12 via a signal line 56A and the pointer address is read out from the read address management table 17T on the basis of the output line number "p" and the connection identifier. The pointer address is given as a read address RA to the buffer memory 11 via a signal line 57, thereby reading out the ATM cell from the cell buffer area 11A to a signal line 55A and simultaneously reading out the pointer address from the pointer area 11B to a signal line 55B.

The read control unit 17 outputs the output line number "p" to a signal line 56B synchronously with the reading out of the ATM cell from the buffer memory 11. The output processing unit 12 extracts the internal header from the ATM cell outputted to the signal line 55A and outputs the ATM cell to an output line OUT-p indicated by the output line number "p". At this time, in the case where the insertion instruction signal of the EFCI bit has been received from a signal line 56A, the second bit (EFCI bit) in the payload type indication bits PT (three bits) included in the header of the ATM cell is set to the bit state "1" indicative of "congestion". After that, the resultant ATM cell is transmitted to the output line OUT-p.

The pointer address read out from the pointer area 11B to the signal line 55B is stored into the read address management table 17T as the next pointer address with which the present pointer address used as the read address RA is replaced. The pointer address used as the read address RA is released to the idle address memory 14.

The read control unit 17 decrements (by −1) the number 152 of stored cells of the entry corresponding to the connection identifier in the queue management table 15-p corresponding to the output line number "p" each time an ATM cell is read out from the buffer memory 11. When the count value becomes zero, the bit corresponding to the connection identifier in the flag table 16-p is changed to "0".

The output connection selection unit 200 determines the identifier of a connection from which a cell is to be transmitted by referring to the queue flag table 16, a guaranteed bandwidth table 18, a shared bandwidth table 19, and a control information table 20 on the basis of the output line number "p" and the time slot number "s" outputted from the read control unit 17 to the signal line 58, and outputs the identifier to the signal line 59.

In a manner similar to the queue flag table 16, the guaranteed bandwidth table 18 is comprised of a plurality of tables 18-i (i=1 to n) corresponding to output line numbers, the shared bandwidth table 19 is comprised of a plurality of tables 19-i (i=1 to n) corresponding to output line numbers, and the control information table 20 is comprised of a plurality of tables 20-i (i=1 to n) corresponding to output line numbers.

Figure 6:
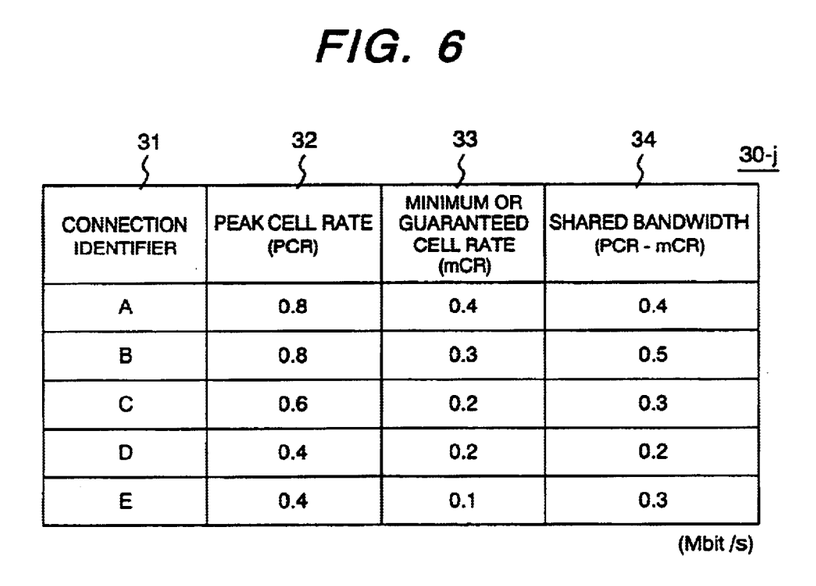
FIG. 6 is a diagram showing an example of a definition table related to a plurality of connections multiplexed on the same line.

A case of guaranteeing, for example, a bandwidth designated in a connection definition table 30-j shown in FIG. 6 with respect to each of connections multiplexed on an output line OUT-j will now be examined.

The connection definition table 30-j shows the relation among connection identifier 31, peak cell rate (PCR) 32, minimum (or guaranteed) cell rate (mCR) 33, and shared bandwidth 34 with respect to each of a plurality of connections multiplexed on an output line having line number (j).

The shared bandwidth 34 has a value (PCR-mCR) obtained by subtracting the minimum cell rate 33 from the peak cell rate 32. The connection identifier 31 is usually expressed by VPI/VCI. For simplicity of explanation, it is assumed here that five connections having the connection identifiers A, B, C, D, and E are multiplexed on the output line OUT-j. In the following, the connections will be called connections A, B, C, D, and E.

Figure 7:
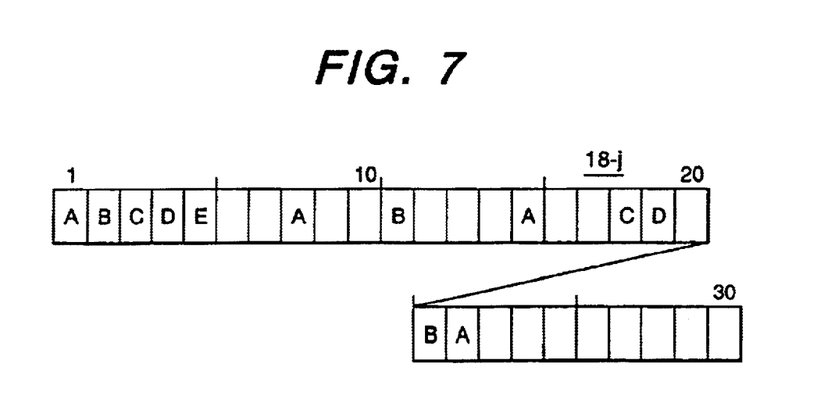
FIG. 7 is a diagram showing an example of the configuration of a guaranteed bandwidth table 18 illustrated in FIG. 1.

FIG. 7 shows the configuration of a guaranteed bandwidth table 18-j which is obtained on the basis of the connection definition table 30-j.

The guaranteed bandwidth table 18-j indicates allocated time slots of each of the connections multiplexed on the output line OUT-j in an output bandwidth of a predetermined period on the output line OUT-j. In this case, the time slots are allocated at a weight ratio according to the minimum cell rate 33 of each of the connections defined in the connection definition table 30-j.

Assuming now that each time slot has the rate of 0.1 Mbit/s on the output line OUT-j, an output bandwidth in the period of 30 time slots becomes 3 Mbit/s. In the connection definition table 30-j, the minimum cell rate of the connection A is 0.4 Mbit/s. Consequently, four time slots are allocated on the connection definition table 30-j. Similarly, three time slots are allocated to the connection B having the minimum cell rate of 0.3 Mbit/s.

Figure 8:
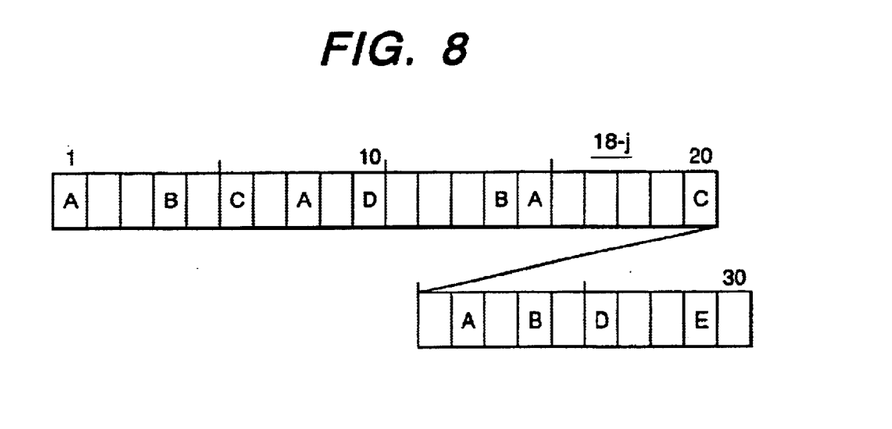
FIG. 8 is a diagram showing another example of the configuration of the guaranteed bandwidth table 18.

The guaranteed bandwidth table 18-j consists of 30 entry areas for storing designated connections of 30 time slots corresponding to the output bandwidth of 3 Mbit/s. In FIG. 7, the time slots are allocated so that the connections are arranged at cell intervals which are equal as much as possible in accordance with the order from the connection having the highest minimum cell rate. In the example, first time slots of the connections A to D are allocated to continuous first to fifth time slots. Alternately, for example, as shown in FIG. 8, the first time slots of the connections A to D may be allocated apart from each other so that the allocated time slots are spread as much as possible.

Figure 9A:
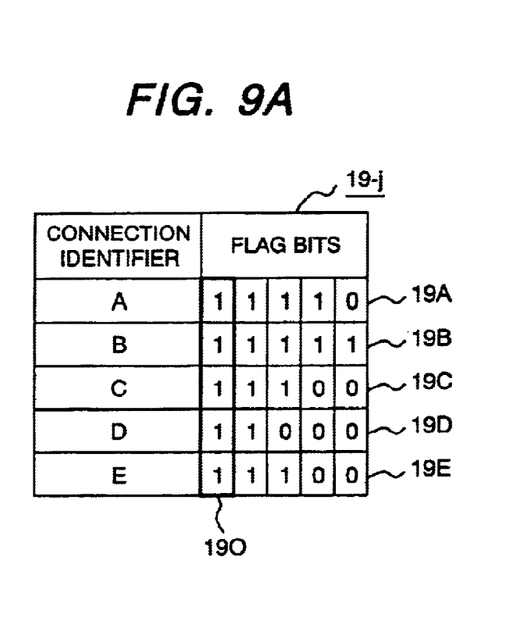
FIG. 9A is a diagram showing an example of the configuration of a shared bandwidth table 19 illustrated in FIG. 1.

FIG. 9A shows an example of a shared bandwidth table 19-j corresponding to the output line OUT-j.

The shared bandwidth table 19-j stores flag bit patterns 19A to 19E corresponding to the connection IDs A to E, respectively. Each of the flag bit patterns is used to show the number of time slots corresponding to the shared bandwidth 34 in the connection definition table 30-j and includes successive flag bit patterns of the number equal to the number of time slots. In the example, the bit length of the flag bit pattern is adjusted to the maximum value of the shared bandwidth 34.

In the connection definition table 30-j, the connection B has the maximum value 0.5 Mbit/s of the shared bandwidth and the number of time slots is equal to five. Consequently, the flag bit pattern 19B of the connection B is "11111". Similarly, the connection A has the value of the shared bandwidth of 0.4 Mbit/s and the number of time slots is equal to four. Consequently, the flag bit pattern 19A is "11110".

Figure 9B:
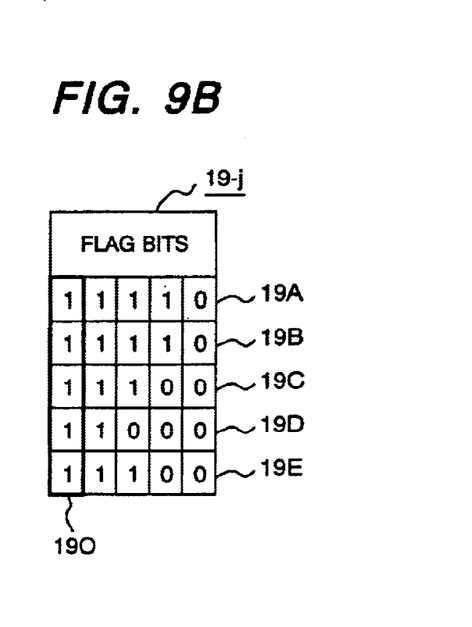
FIG. 9B is a diagram showing a change in the contents of the shared bandwidth table 19 in association with transmission of a cell.

The flag bit pattern in the shared bandwidth table 19-j denotes the number of idle time slots that can be used by each of the connections. For example, when the connection B transmits a cell once by using an idle time slot, as shown in FIG. 9B, the bit pattern 19B is changed from "11111" to "11110". At the time point when the number of transmitting cells by using the idle time slots becomes five, the flag bit pattern of the connection B becomes "00000", and use of the idle time slots after that is inhibited.

According to the embodiment, when the time slots guaranteed by the guaranteed bandwidth table 18-j and the idle time slots indicated by the flag bit pattern in the shared bandwidth table 19-j are maximally used, each of the connections transmits cells within the range of the peak cell rate 32 indicated in the connection definition table 30-j.

The flag bit pattern in the shared bandwidth table 19-j is initialized to the bit pattern shown in FIG. 9A at the time point when all the time slot positions in the guaranteed bandwidth table shown in FIGS. 7 and 8 are used and the first time slot is to be allocated again.

Figure 10:
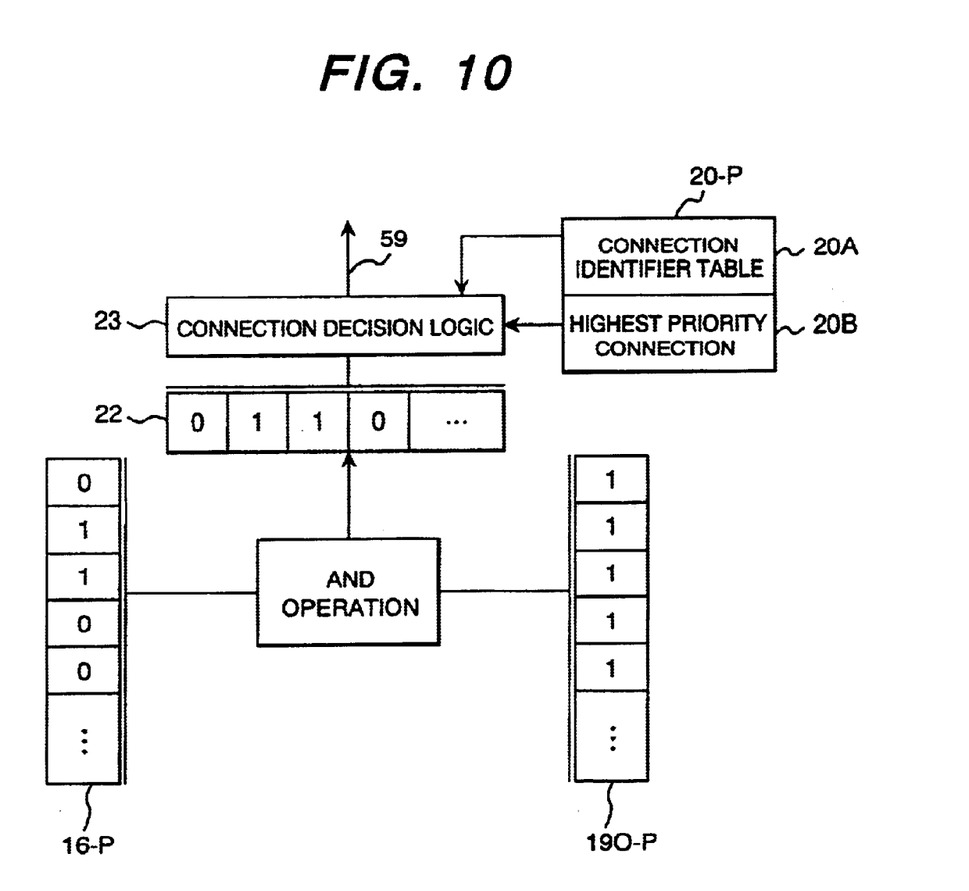
FIG. 10 is a diagram schematically showing a connection allocating function to an empty time slot of an output connection selection unit 200 illustrated in FIG. 1.

FIG. 10 is a diagram schematically showing the function of allocating connections to idle time slots of the output connection selection unit 200.

When it is found that the s-th time slot of the output line number "p" designated by the read control unit 17 is in an idle state, the output connection selection unit 200 obtains the AND of a bit pattern 190-p of a set of the first bits in the flag bit pattern group stored in the shared bandwidth table 19-p corresponding to the output line number "p" and the bit pattern indicated by the flag table 16-p corresponding to the output line number "p".

In this case, in the two bit patterns 190-p and 16-p, bits are arranged in accordance with the order of the connection identifiers so that the flag of the same connection is in the same bit position. The result of the AND operation therefore becomes a bit pattern 22 in which a transmission waiting connection which has the right of use of the idle time slot and has a cell stored in a cell queue in the buffer memory 11 is indicated by the bit "1".

A connection decision logic 23 decides a connection from which a cell is to be transmitted by the s-th time slot in the idle state on the basis of the bit pattern 22 obtained by the AND operation and highest priority connection designating information 20B stored in the control information table memory 20-p. The highest priority connection designating information is provided to avoid that an idle time slot (shared bandwidth) is consecutively allocated to the same connection. For example, the information indicates the bit position corresponding to a connection positioned subsequent to the previous connection to which the shared bandwidth is allocated in the connection identifier arrangement.

When a bit indicated by the highest priority connection designating information in the bit pattern 22 is "1", the connection decision logic 23 outputs a connection identifier corresponding to the bit to the signal line 59 and stores the next bit position as new highest priority connection designating information 20B into the memory 20-p. When the bit indicated by the highest priority connection designating information is "0", a decision is circularly made from the next bit in the bit pattern 22, a connection identifier corresponding to the bit "1" which is found first is outputted to the signal line 59, and the next bit position is stored as new highest priority connection designating information into the memory 20B. The bit position in the bit pattern 22 is converted to a connection identifier with reference to connection identifier table (connection identifier arrangement information) 20A stored in the control information table 20-p.

Figure 11:
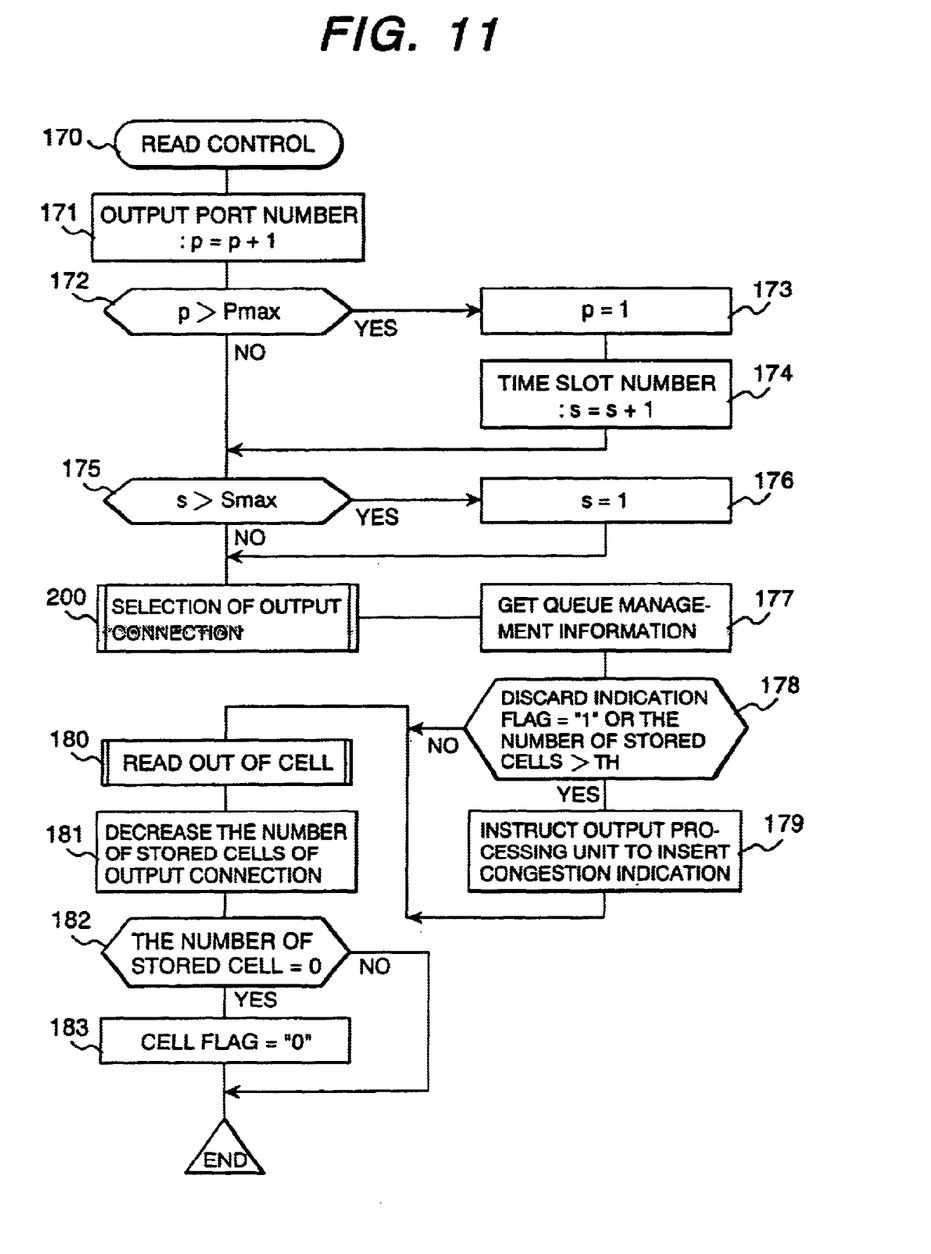
FIG. 11 is a flowchart showing operations of a read control unit 17 illustrated in FIG. 1.

FIG. 11 shows the flow of control operations executed by the read control unit 17.

The read control unit 17 increments the value of the parameter "p" indicative of the output port number synchronously with a control clock RCK (step 171) and compares the value of "p" with the maximum value Pmax of the output line number (step 172). When the value of the parameter "p" exceeds Pmax, the value of "p" is reset to the initial value of 1 (step 173) and increments the value of the parameter "s" indicative of the time slot number in the guaranteed bandwidth table 18 (step 174) Subsequently, the value of the parameter "s" is compared with the maximum value Smax (step 175). When the value of the parameter "s" exceeds Smax, the value is reset to the initial value (s=1) (step 176).

The read control unit 17 supplies the values of the parameters "p" and "s" to the output connection selection unit 200 to determine the output connection (step 200). When the connection identifier of the output connection from which a cell is to be transmitted is determined, the queue management information corresponding to the connection identifier is read out from the queue management table 15-p corresponding to the output port number "p" (step 177), and the state of the discard indication flag 154 and whether the number 152 of stored cells (cell queue length) exceeds the threshold 153 or not is determined (step 178). The threshold 153 indicates, as shown by reference characters TH in FIG. 5, the number of cells allowed to be stored in the cell queue 110-i of each connection formed in the cell buffer area 11A in the buffer memory 11.

In the embodiment, when the cell queue length 152 exceeds the threshold TH or when the discard indication flag is "1", the read control unit 17 determines that the cell transmission rate in the connection exceeds the allowable range and instructs a cell source end system to suppress the transmission cell amount. The suppression of the transmission cell amount is achieved as follows. Insertion of the explicit forward congestion indication (EFCI) bit is instructed from the read control unit 17 to the output processing unit 12 via the signal line 56A (step 179), the output processing unit 12 which has received the instruction changes the EFCI bit in the payload type (PT) field in the header of a user cell read out from the cell queue 110-i to "1", thereby notifying the destination end system of occurrence of congestion, and the destination end system returns the RM cell to the source end system.

After instructing the insertion of the EFCI bit, the read control unit 17 taken out the read address RA corresponding to the connection identifier from the read address management table 17T-p corresponding to the output port number "p", and reads out the ATM cell and the pointer address from the buffer memory 11 in accordance with the read address RA (step 180). When the connection from which a cell is to be transmitted does not exist, an idle cell is transmitted.

After that, the read control unit 17 subtracts a value of one cell from the count value of the number 152 of stored cells corresponding to the connection identifier in the queue management table 15-p (step 181). When the number of stored cells becomes zero (step 182), the cell flag corresponding to the connection identifier in the flag table 16-p is changed to "0".

Figure 12:
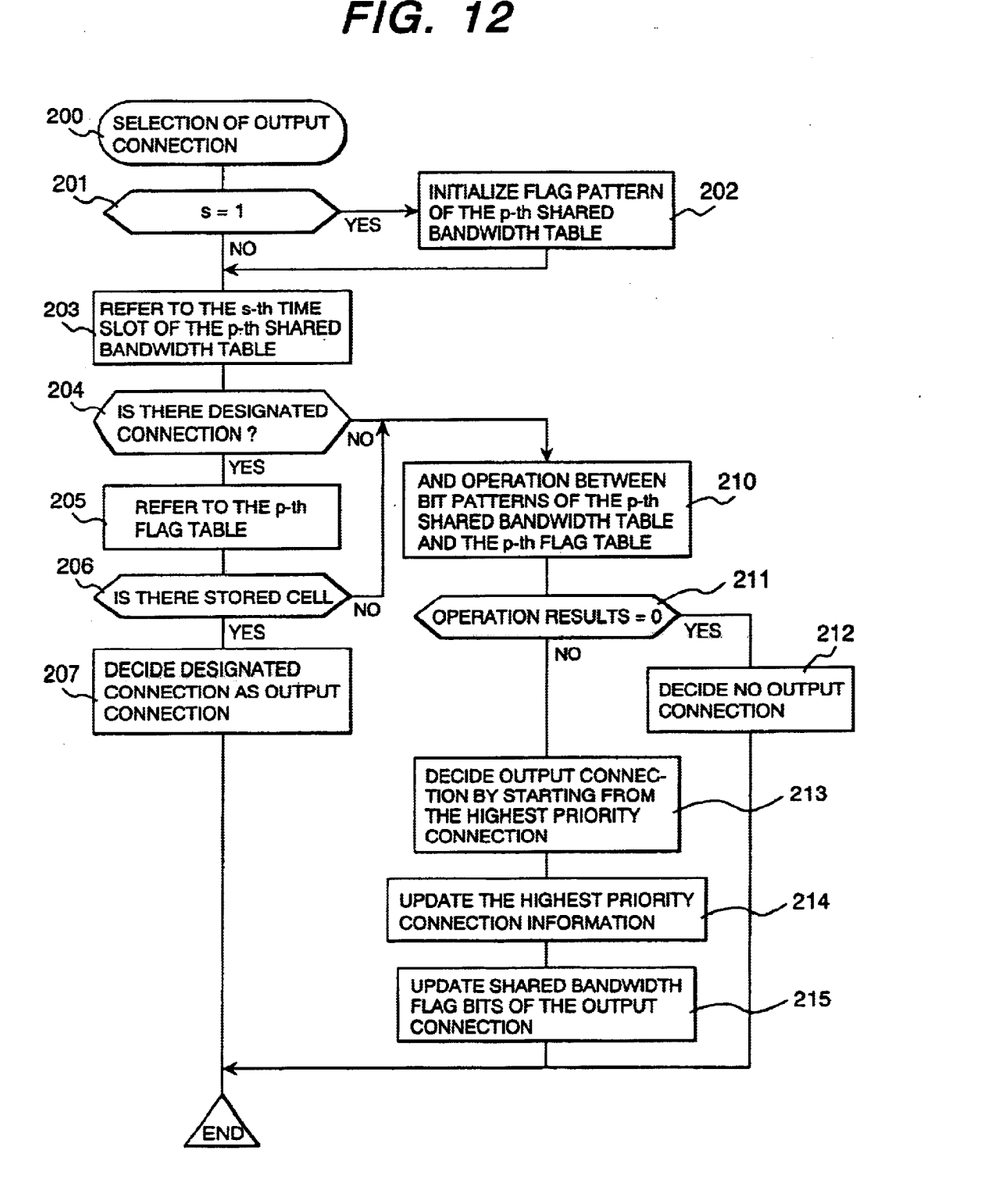
FIG. 12 is a flowchart showing operations of the output connection selection unit 200.

FIG. 12 shows the flowchart of control operations executed by the output connection selection unit 200.

On receipt of the parameters "p" and "s" from the read control unit 17, the output connection selection unit 200 first determines the value of the time slot number "s" (step 201). At the time point when the time slot number "s" becomes the initial value (s=1), the flag bit in the shared bandwidth table 18-p corresponding to the output line number "p" is reset to an initial bit pattern (step 202).

The output connection selection unit 200 refers to the s-th time slot in the guaranteed bandwidth table 18-p corresponding to the output line number "p" (step 203) and determines the presence or absence of a designated connection. When there is a designated connection, the flag table 16-p corresponding to the output line number "p" is referred to (step 204) and the presence or absence of the stored cells in the designated connection is determined (step 205). When there are stored cells in the designated connection, the designated connection is determined as a connection from which an ATM cell is to be read (step 207).

When there is no designated connection in the s-th time slot in the guaranteed bandwidth table 18-p or there is no stored cell in the designated connection, the AND of the flag bit patterns in the shared band width table 19-p and the flag table 16-p corresponding to the output line number "p" is calculated (step 210). When the operation result is checked (step 211) and the value of the operation result is zero, it is decided that there is no output connection from which a cell is to be transmitted (step 212). When the operation result is not zero, an output connection is determined on the basis of the highest priority connection information from the bit pattern indicated by the operation result (step 213) and, after that, the highest priority connection information and the shared bandwidth flag pattern of the output connection are updated (steps 214 and 215).

The identifier of the output connection determined in step 207 or 213 or the selection result indicative of no output connection determined in step 212 is replied to the read control unit 17 via the signal line 59.

Figure 13:
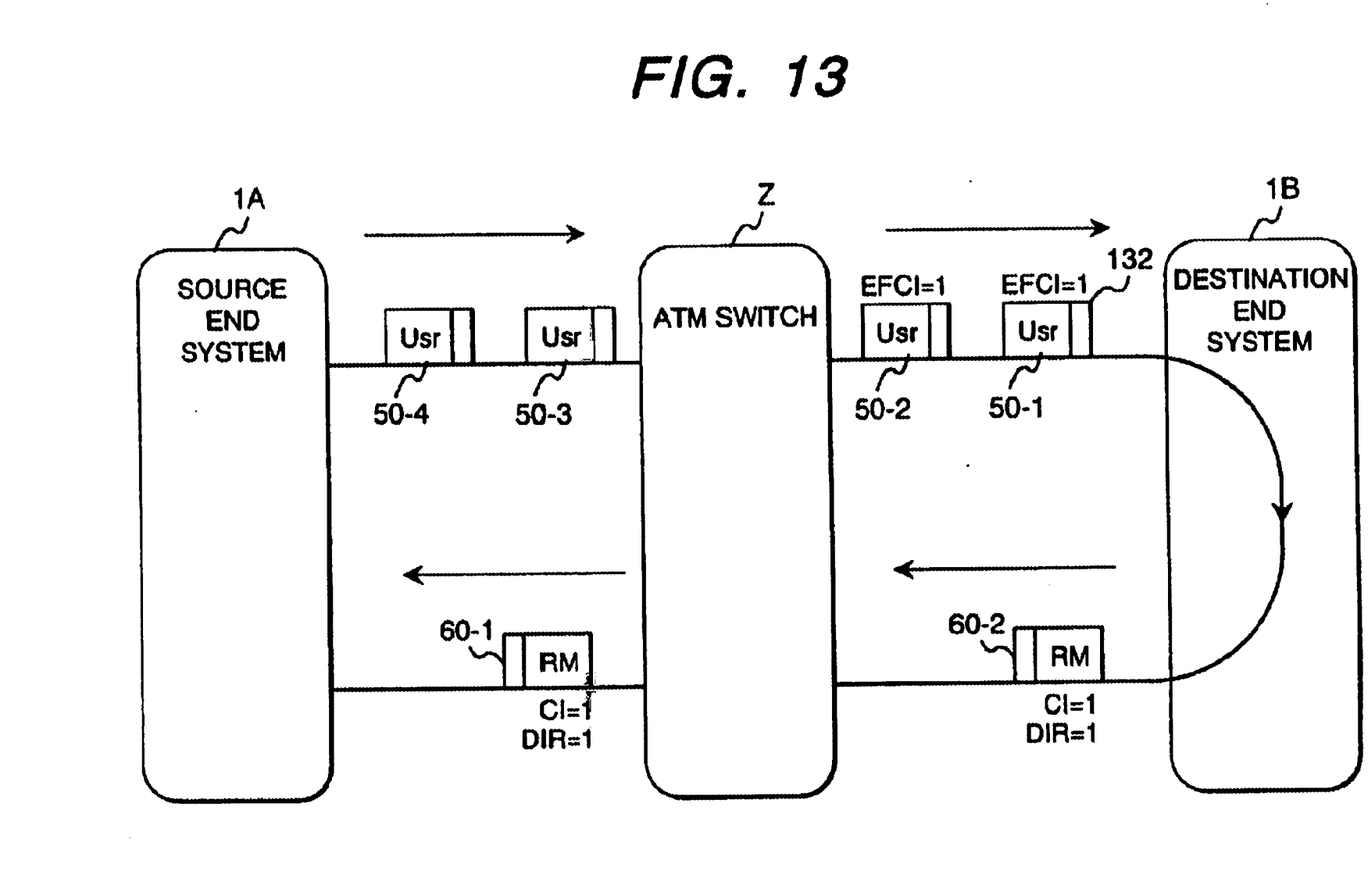
FIG. 13 is a diagram showing a control procedure for avoiding congestion in the invention.

FIG. 13 shows a control procedure of avoiding congestion according to the invention.

Shown in the diagram are a source end system 1A, a destination end system 1B, an ATM switch 2 having the above-described configuration, and ATM cells 50-1 to 50-4 transmitted from the source end system 1A to the destination end system 1B.

When the amount of cells transmitted from the source end system 1A increases and exceeds, for example, the peak cell rate (PCR) preliminarily declared, the amount of cells stored in the cell queue corresponding to a connection between the systems 1A and 1B formed in the ATM switch 2 increases and the cell queue length exceeds the threshold TH. In the ATM switch 2 of the invention, when the cell queue length exceeds the threshold TH, irrespective whether the buffer memory 11 actually enters a cell discarding state or not, by setting the EFCI bit in the cell read out from the cell queue to "1", it is notified to the destination end system 1B that as if congestion occurs in the ATM switch 2, and the RM cells 60-1 and 60-2 are returned from the destination end system 1B to the source end system 1A.

Figure 14:
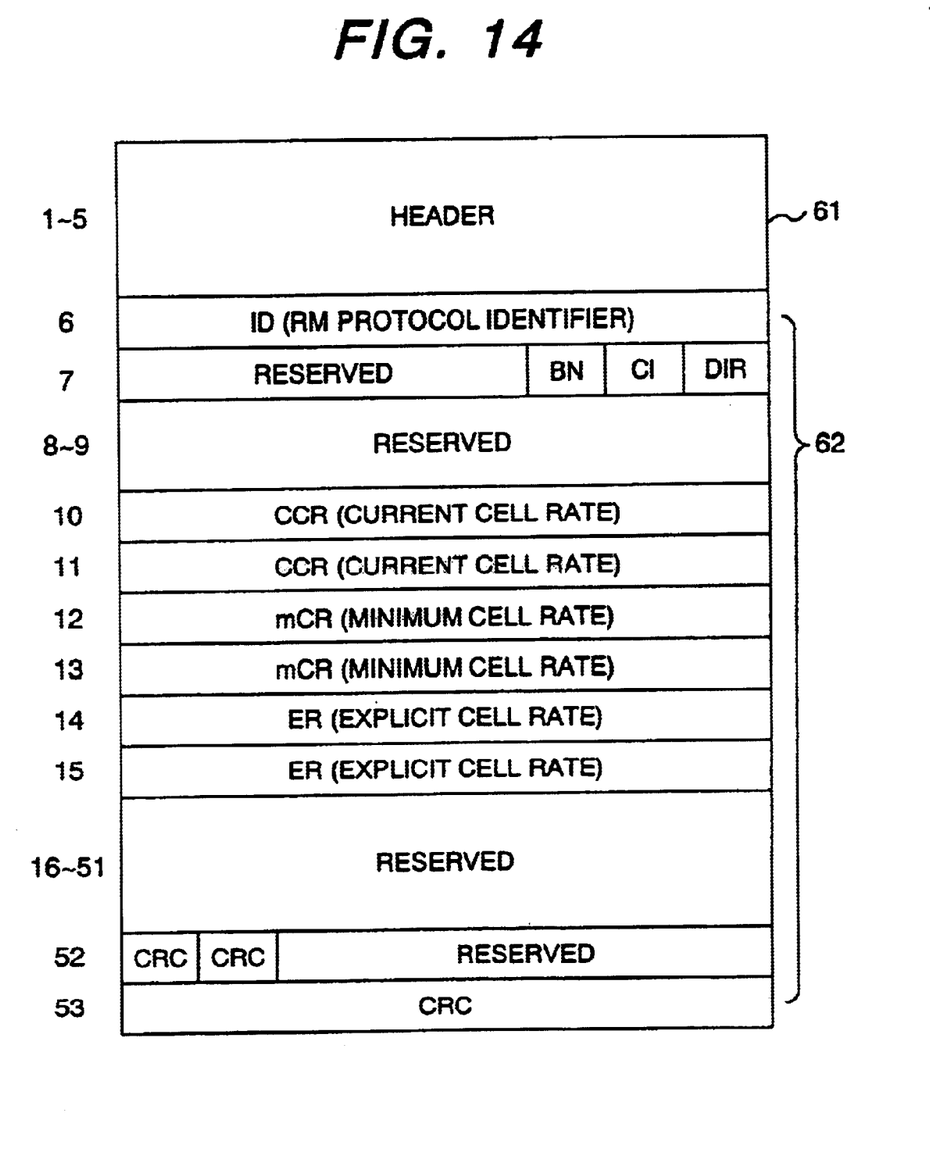
FIG. 14 is a diagram showing the cell format of an RM cell.

The RM cell is comprised of, as shown in FIG. 14, in a manner similar to the user cell, a header 61 of five bytes and a payload 62 of 48 bytes. In the header 61 of the RM cell, for example, in the case of a virtual path, "6" is set in a virtual channel identifier (VCI) field, and "110" is set in a payload type identifier (PTI) field. In the case of the virtual connection, "110" is set in the PTI.

The payload 62 starting from the sixth byte of the RM cell includes an RM protocol identifier in the sixth byte. In the seventh byte, the first to fifth bits are used as a reserved area which will be used in future, the sixth bit is set as a BN (Backward Notification) bit for backward congestion notification, the seventh bit is set as a CI (Congestion Indication) bit for indicating congestion, and the eighth bit is set as a DIR (direction) bit indicative of the transfer direction of the RM cell. The eighth and ninth bytes in the RM cell are a reserved area. A current cell rate (CCR) is set in the 10th and 11th bytes. A minimum cell rate (mCR) is set in the 12th and 13th bytes. An explicit cell rate (ER) is set in the 14th and 15th bytes. The 16th to 51st bytes and the third to eighth bits in the 52nd byte are reserved areas to be used in future. A cyclic redundancy check (CRC) of payload information is set in the first and second bits in the 52nd byte and the 53rd byte.

The destination end system 1B which has received the user cell 50 including congestion indication from the ATM switch 2 transmits an RM cell 60 in which each of the CI bit and the DIR bit is set to "1" to the source end system 1A, thereby promoting suppression of the cell transmission amount. When the RM cell in which the CI bit is set to "1" is received, in order to avoid congestion in the ATM network, the source end system 1A suppresses the transmission cell amount. The operation of suppressing the transmission cell amount: is continued until it is confirmed that the transmission of the RM cell in which the CI bit is "1" is stopped.

In the foregoing embodiment, a logical variable length cell queue linked by the pointer address is formed in the common buffer memory 11 in correspondence with each connection identifier, and the source end system is notified of the connection in which the queue length exceeds the threshold TH to suppress the transmission cell amount, thereby avoiding occurrence of congestion. Even if cell discarding occurs due to insufficient capacity of the buffer memory, by discarding the subsequent cells belonging to the same packet of the discarded cell, the buffer memory and the line bandwidth are prevented from being used by useless cells.

As another embodiment of the invention, it is also possible to preliminarily divide the buffer memory 11 into a plurality of buffer areas having fixed length, allocate the buffer area of the fixed length to each connection, and write and read out ATM cells to and from the buffer memory in an FIFO fashion by using the buffer area as a fixed length individual cell queue.

In the fixed length individual cell queue, the address of a cell area from which an ATM cell is to be read out next is stored as a read address pointer RAP and the address of a cell area to which ATM cell is to be written next is stored as a write address pointer WAP for each queue. It is sufficient to circularly update the valued of the pointers RAP and WAP cell by cell each time an ATM cell is read out and written from and to the buffer memory.

For example, in the ATM switch of FIG. 1, an identifier of a buffer area (cell queue) to be used and the pointers WAP and RAP are stored in correspondence with the connection identifier in each queue management table 15 provided for each output line. On the basis of the output line number "p" of an input cell and the connection identifier, the write control unit 13 reads the queue identifier and the write address pointer WAP from the queue management table 15-p, writes the input cell to the cell area indicated by the pointer WAP in the buffer area indicated by the queue identifier and, after that, updates the address pointer WAP. On the other hand, the read control unit 17 reads the queue identifier and the read address pointer RAP from the queue management table 15-p on the basis of the output line number "p" and the connection number designated by the output connection selection unit 200, reads out a cell from a cell area indicated by the pointer RAP in the buffer area indicated by the queue identifier and, after that, updates the read address pointer RAP.

In the case of adopting the fixed length individual cell queue system, the write address management table 13T, the read address table 17T, and the pointer area 11B in the buffer memory are unnecessary. In the fixed length individual cell queue system, different from the shared buffer system, the number of cells which can be stored in each connection is limited (by the upper limit value). Consequently, when the number of stored cells reaches the upper limit value at the time point of writing a cell, cell discarding occurs.

The cell discarding can be avoided by setting the threshold TH for setting the EFCI bit in the output cell to "1" to a value sufficiently lower than the upper limit value of the number of stored cells and suppressing the amount of cells transmitted from the source end system before the number of stored cells reaches the upper limit value. When a number of nodes are interposed between the source end system and the destination end system, however, the response to the cell suppressing control becomes delay.

For example, in the case where the amount of allocating the unused bandwidth to each of the connections decreases due to an increase in traffic and the transfer rate in the ATM network decreases to a bandwidth close to the minimum cell rate, on the contrary, in the case where the source end system transmits cells at a rate higher than the peak cell rate, the amount of stored cells gradually increases in any of the nodes, and congestion indication is added to a cell read out from the cell queue whose number of stored cells exceeds the threshold TH. In this case, when a number of nodes are interposed between the source end system and the destination end system, cells are overflowed from the cell queue before the RM cell generated in the destination end system reaches the source end system, and there is the possibility that the cells are discarded. The possibility of discarding the cells can be reduced by setting the threshold TH at a lower value. When the shared buffer system in which the cell queue has a variable length is adopted, the possibility of discarding cells can be further reduced.

In the case of adopting the fixed length individual cell queue, it is desirable to indicate the storage location of the first cell of a packet being stored in each cell queue, for example, by a pointer HCP stored in the queue management table 15. In the case where the discarding of a cell occurs, by resetting the write address pointer WAP to the value of the HCP, preceding cells that belong to the same packet as the discarded cell and have been already stored can be discarded in a lump. In this case, by sequentially discarding the subsequent cells (including the EOP cell) of the packet, the cells can be discarded on the packet unit basis.

When the first cell of the packet has been already read out from the cell queue and the pointer HCP has been cleared, by reading out the write address pointer WAP and resetting the write address pointer WAP to the value of the pointer RAP, all of the stored cells are discarded. In this case, it is sufficient to sequentially discard following cells and store the EOP cell in the discarded packet and a group of cells of the next packet received thereafter into a cell queue.

As described above, by discarding new input cells as well as cells having been already stored in the buffer memory on the packet unit basis, congestion in the ATM node can be promptly solved. By stopping the transmission of the preceding cells that become now meaningless even if they are transferred because some of the subsequent cells have been already discarded, the traffic of useless cells in the downstream area of the ATM network can be suppressed.

As obviously understood from the above description, according to the invention, the ATM cell transfer guaranteeing the minimum cell rate of each connection and effectively utilizing the idle bandwidth in the transmission line within the range of the peak cell rate of each connection is performed. Thus, the throughput of cells at an ATM node is improved and, as a result, the necessary capacity of the buffer memory per connection can be reduced.

Further, according to the invention, when the amount of stored cells in the buffer memory exceeds the threshold preset for each connection, the control operation for suppressing the amount of cells transmitted from the source end system is started. Consequently, an increase in amount of stored cells in the buffer memory can be suppressed and the occurrence of discarding of cells can be prevented. According to the invention, even if the discarding of cells occurs, by discarding the subsequent cells belonging to the same packet as the discarded cell and, if it is possible, also discarding already stored preceding cells which belong to the same packet as the discarded cell, the congestion state is promptly solved and the ATM network resources can be effectively used.

What is claimed is:

1. An Asynchronous Transfer Mode (ATM) communication apparatus which is connected to a plurality of input lines and a plurality of output lines and transmits a cell received from each of the input lines to one of the plurality of output lines, which is specified by connection identification information included in a header of the cell, comprising:

a buffer memory for temporarily storing cells received from each of the input lines;

a write control unit for writing the cells received from each of the input lines into the buffer memory so that cells stored in the buffer memory form cell queues corresponding to connections for each output line;

a read control unit for reading out cells from each of cell queues formed in the buffer memory while guaranteeing a minimum cell rate predetermined for each connection within a range not exceeding a predetermined peak cell rate; and means for adding congestion indication to a cell read out from a cell queue of which stored cell amount exceeds a preset threshold, wherein the read control unit comprises:

a guaranteed bandwidth table in which information for allocating time slots to each of a plurality of connections multiplexed on the output line while guaranteeing a minimum cell rate is stored for each of the output lines, a shared bandwidth table in which information indicative of an allocation range of idle time slots allowed to each of the connections multiplexed is stored for each of the output lines, and means for determining a connection for which a cell is to be read out by referring to the shared bandwidth table in a time slot which enters an idle state since there is no cell to be transmitted in a cell queue in a connection designated by the guaranteed bandwidth table and an idle time slot to which a connection is not designated in the guaranteed bandwidth table.

2. An ATM communication apparatus according to claim 1, further comprising:

a flag table in which the presence or absence of a stored cell in each of the connections multiplexed is indicated by a flag bit for each of the output lines, wherein a flag bit train indicative of the number of idle time slots allocatable to each of the connections multiplexed is stored as the information in the shared bandwidth table, and wherein the connection determining means determines a connection for which a cell is to be read on the basis of a result of an operation performed between a group of flag bits arranged in accordance with the order of connections indicated by the flag table and a group of flag bits arranged in accordance with the order of connections extracted from the shared bandwidth table.

3. An ATM communication apparatus according to claim 1, wherein the connection determining means has means for avoiding successive allocation of idle time slots to the same connection.

4. An ATM communication apparatus according to claim 2, wherein the connection determining means has means for avoiding successive allocation of idle time slots to the same connection.

5. An Asynchronous Transfer Mode (ATM) communication apparatus which is connected to a plurality of input lines and a plurality of output lines and transmits a cell received from each of the input lines to one of the plurality of output lines, which is specified by connection identification information included in a header of the cell, comprising:

a buffer memory for temporarily storing cells received from each of the input lines;

a write control unit for writing the cells received from each of the input lines into the buffer memory so that cells stored in the buffer memory form cell queues corresponding to connections for each output line;

a read control unit for reading out cells from each of cell queues formed in the buffer memory while guaranteeing a minimum cell rate predetermined for each connection within a range not exceeding a predetermined peak cell rate; and means for adding congestion indication to a cell read out from a cell queue of which stored cell amount exceeds a preset threshold, wherein the write control unit has means for selectively discarding not only a received cell which becomes unable to be written into the buffer memory but also subsequent received cells belonging to the same connection as the cell failed to be written into the buffer memory.

6. An Asynchronous Transfer Mode (ATM) communication apparatus which is connected to a plurality of input lines and a plurality of output lines and transmits a cell received from each of the input lines to one of the plurality of output lines, which is specified by connection identification information included in a header of the cell, comprising:

a buffer memory for temporarily storing cells received from each of the input lines;

a write control unit for writing the cells received from each of the input lines into the buffer memory so that cells stored in the buffer memory form cell queues corresponding to connections for each output line;

a read control unit for reading out cells from each of cell queues formed in the buffer memory while guaranteeing a minimum cell rate predetermined for each connection within a range not exceeding a predetermined peak cell rate; and means for adding congestion indication to a cell read out from a cell queue of which stored cell amount exceeds a preset threshold, wherein the write control unit has means for selectively discarding a received cell which becomes unable to be written to the buffer memory, a cell which belongs to the same connection as the received cell and has been already stored, and a subsequent received cell belonging to the same connection as the first mentioned received cell.

7. An Asynchronous Transfer Mode (ATM) communication apparatus which is connected to a plurality of input lines and a plurality of output lines and transmits a cell received from each of the input lines to one of the plurality of output lines, which is specified by connection identification information included in a header of the cell, comprising:

a buffer memory for temporarily storing cells received from each of the input lines;

a write control unit for writing the cells received from each of the input lines into the buffer memory so that cells stored in the buffer memory form cell queues corresponding to connections for each output line;

a read control unit for reading out cells from each of cell queues formed in the buffer memory while guaranteeing a minimum cell rate predetermined for each connection within a range not exceeding a predetermined peak cell rate; and means for adding congestion indication to a cell read out from a cell queue of which stored cell amount exceeds a preset threshold, wherein the write control unit has means for selectively discarding received cells belonging to the same packet to which a preceding received cell which becomes unable to be written to the buffer memory belongs.

* * * * *